Sept. 23, 1969  C. A. BARRETT ET AL  3,468,336
HYDRAULIC CONTROL VALVE FOR HIGH PRESSURE HYDRAULIC APPLICATIONS
Filed March 9, 1967  3 Sheets-Sheet 3
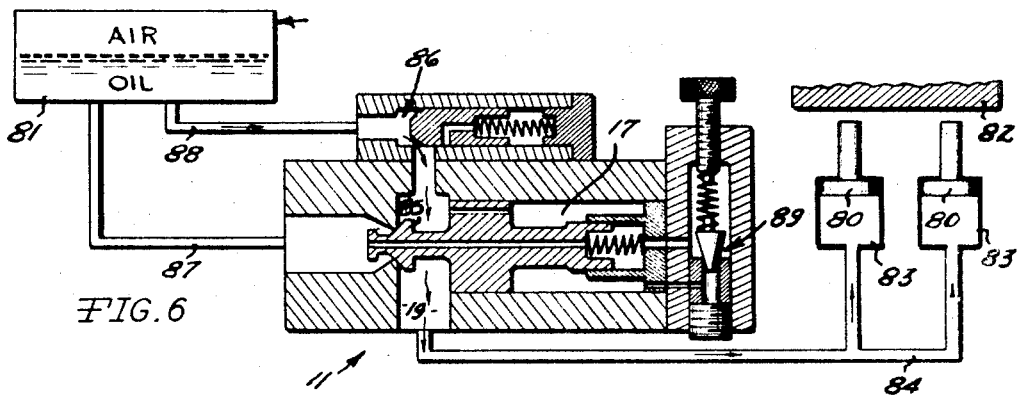
FIG.6
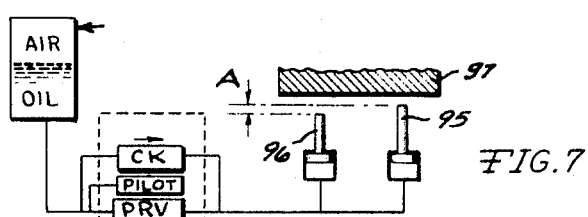
FIG.7
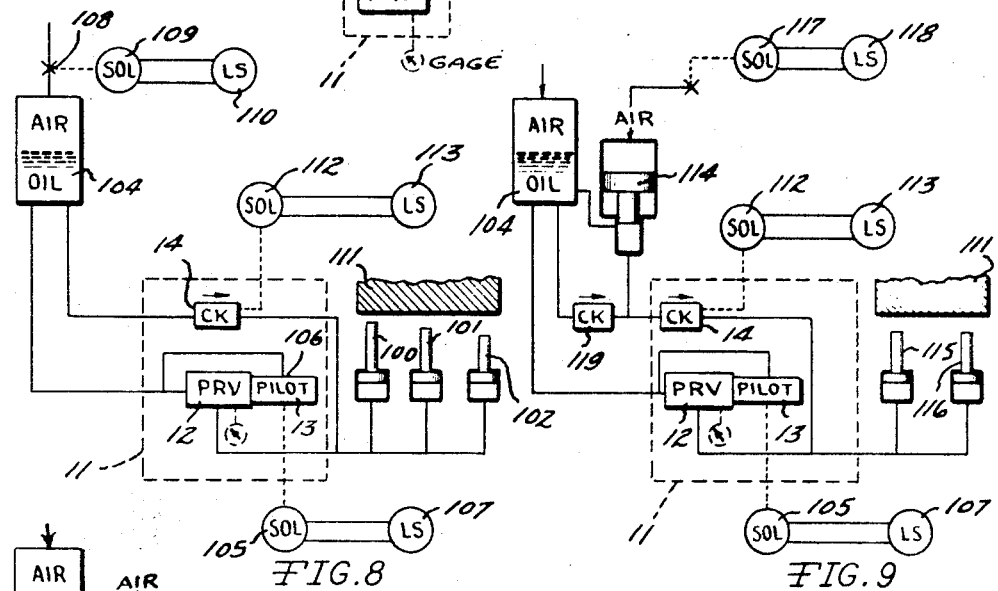
FIG.8   FIG.9
FIG.10
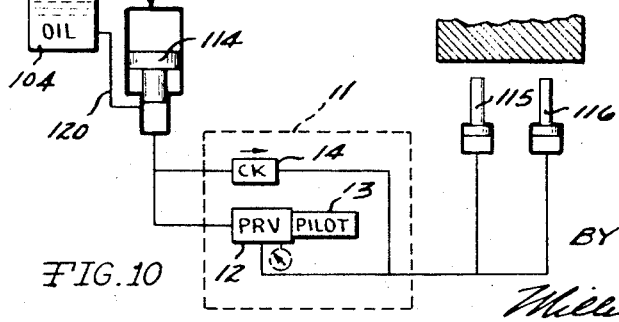
INVENTORS
CEDRIC A. BARRETT
BY WILLIAM (NMI) PHILLIPS
Miller Morris Pappas & McLeod
ATTORNEYS "# United States Patent Office 3,468,336
Patented Sept. 23, 1969

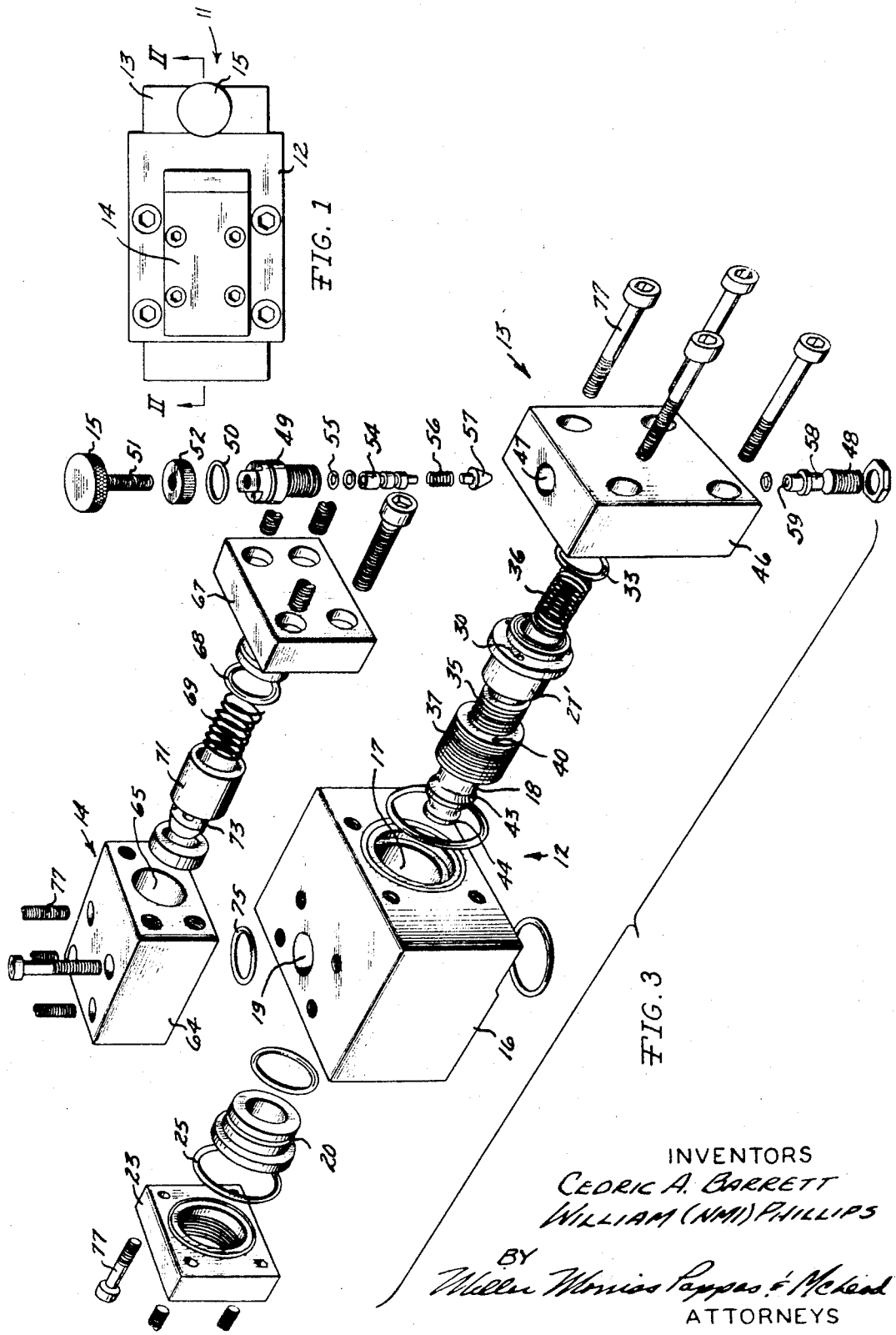

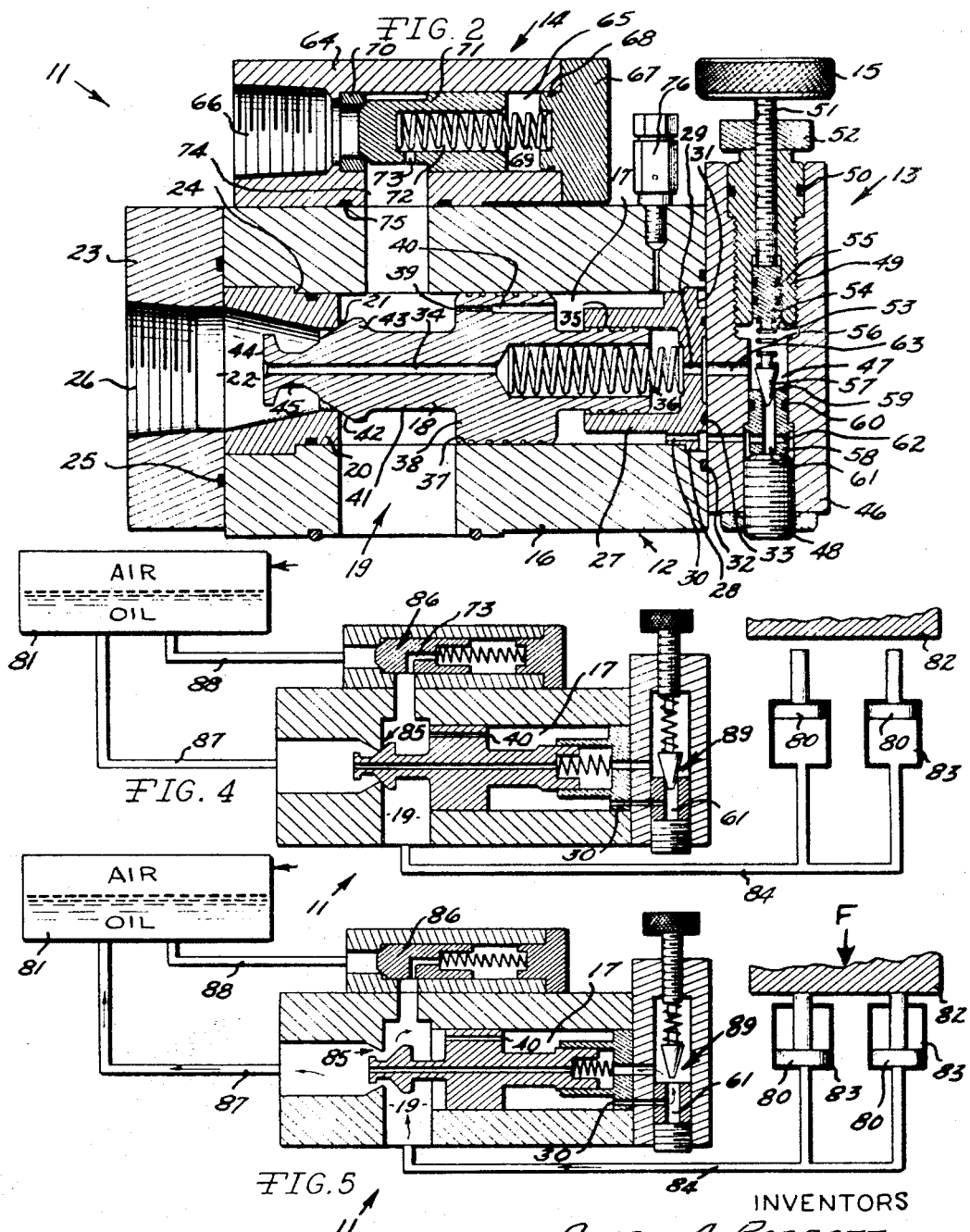

3,468,336
HYDRAULIC CONTROL VALVE FOR HIGH PRESSURE HYDRAULIC APPLICATIONS
Cedric A. Barrett, Grand Rapids, and William Phillips, Wyoming, Mich., assignors to Grand Valley Machine & Tool Co., Grand Rapids, Mich., a corporation of Michigan
Filed Mar. 9, 1967, Ser. No. 621,912
Int. Cl. F16k 15/18, 31/163
U.S. Cl. 137—489
9 Claims

ABSTRACT OF THE DISCLOSURE

A valve for principal use in association with press actuated hydraulic cylinders and including a pilot section, an unloading section and a check valve section wherein the pilot responsive unloading valve includes a new and improved relieved snubber or buffer and controlled through-flow to pilot and wherein the modular relation of valve elements admits of simple assembly, disassembly and manufacture while providing a wider range of capacity in a given valve size.

Summary

The present invention relates to a combination valve especially useful with press actuated hydraulic cylinders and including a pilot section, an unloading section and a check valve section wherein the pilot responsive unloading valve includes a new and improved relieved snubber or buffer and controlled through-flow to pilot and in which the valve components are in modular relation to each other facilitating manufacture resultant ease of maintenance, assembly and disassembly while providing a wider range of capacity in any given valve size and amenability to circuit integration.

Energy storage systems in dies and presses originated with springs, allowing a part of the energy expended by the press upon closing to be stored and used to extend portions of the die or to perform a variety of work functions. Earliest applications of such devices in conversion to an elastic media such as air or combinations of a compressible gas on an uncompressible liquid were recognized for example in the States patent art in United States Letters Patents to Nelson 1,503,131, Rode 1,706,073 and Glasner 1,849,711. As applied solely to dies, the United States Letters Patent to Brown 1,577,446 established the same basic circuit. As the versatility of these systems began to be appreciated, means were incorporated in the basic circuit to increase the capacity of the system, to selectively delay the release of stored energy, to enhance the power available in return and to apply varying resistance to the press action in a single stroke and even to release pressures sequentially. At the heart, however, of each of these systems, the circuit requires a pressure relief valve to provide set resistance to flow in one direction as the press closes and a check valve assuring flow through the pressure relief valve on closure of the press or die and by-pass around the pressure relief valve on return of fluid. Characteristically, best control is accomplished by piloted relief valves in which the pilot is the relief valve energizing or opening a dumping or unloader valve section. A small volume of oil at operating pressure moves through the pilot and a large volume is controlled through the associated unloading section. The use of a pilot also provides a simple means to override the set resistance by mechanical, hydraulic, electrical or pneumatic means or combinations of these at selected press positions.

In a similar manner, the check valve may be overridden or blocked to prevent or delay return flow as desired.

Generally, conventional valves have been seen in this industry, usually purchased valves, modified to mount in the circuit at selected spots. Some highly complex valves have been devised as in the United States Letters Patent to Williamson 2,890,669. Integral body control valve structures were introduced in United States Letters Patent 2,930,398 to Barrett and Kingsbury. The present valve structure presents substantial improvement over the control valve seen in United States Letters Patent 2,930,398.

As die complexity has increased, the number of actuators or cylinders and pistons resisting press motion or requiring actuation on return has increased and the master control valves have required additional capacity range while retaining high sensitivity to flow factors characteristic of presses, either mechanical or hydraulic. Hence, the selection and performance of an operating or control valve in hydraulic circuits for dies in presses is very critical. The operations performed by the valves must be smooth over a substantial variance in capacity at any given pressure setting. At the same time, the performance must be sensitive and accurate and provision must be included for accessory attachment in the circuit along the ease of fabricating and simplicity of assembly and disassembly.

Accordingly, the principal object of the present invention is to provide control valve structure for use with cushion pistons in dies for press usage which is modular in structure.

Another object is to provide a control valve with a new and improved snubber cushioning the impact of opening and closing of the unloading section and hence providing smooth valve performance over the full capacity range of a particular valve size.

Still another object is to provide a new and improved control valve structure, each valve within which structure can be modified or removed without dismantling other valve elements, for substitution of accessories and for variance in positioning in a characteristic circuit.

Other objects including simplicity, rugged dependability and ease of servicing will be readily appreciated by those skilled in the art as the description proceeds.

General description

Generally, the valve structure of the present invention is positioned intermediate a tank or reservoir for hydraulic fluid and one or more actuating pistons. These pistons may be located in either the upper or lower die sections or in the platen of the press or in the press bed, or both. The tank is provided with a resilient or compressible media such as compressed air above the hydraulic fluid and sufficient pressure is applied thereto to assure that the working pistons served by the valves are extended when press pressures are relieved. In certain instances as where enhanced return pressures are required a booster or pressure multiplier is applied to the fluid and provides pressure values for doing work, i.e. stripping or reverse forming where requirements are in excess of normal tank return pressures. The valve structure of the present invention includes three valve sections; a check valve of the piston type, a pilot valve, and a main or unloading valve opened or closed by the pilot. Each of these sections is in block or modular form and is applied directly to the other of the sections and may be removed therefrom without disturbance of any of the other of the valve sections.

The unloading valve element is of the spool valve type normally biased closed and preventing flow to or from the tank. A double stepped snubber or buffer extends from the unloading valve element and beyond the unloading valve seat and into the cavity of the tank connection. The unloader valve element is conically flared where it meets the valve seat and thereafter abruptly drops away to a substantially reduced dimension at the valve body."

The unloader valve intersects but does not interfere with the flow in the merging check valve passage. Hence, the major cavity in the unloader valve section is in communicating relation to both check valve and unloader with consequent reduction in friction factors, since the major cavity is large in relation to connecting conduits or hydraulic lines.

The check valve section is secured to the unloading section so as to normally close the opening from the major cavity of the unloading valve. The closing bias is by spring and is enhanced by any existing pressure differential between tank and major cavity in the unloader. As will be appreciated, the check valve section is shown with a piston type valve. The check valve section may be modified by substitution of a time delay element in the form of a flow retarder (orificial); an hydraulic delay valve (metered delay); or mechanical, electrical or pneumatic block releases all selectively delaying the opening of the check valve element.

The pilot valve section closes the axial cavity of the unloading valve and comprises a variable setting spring loaded needle valve closing an orifice. Flow to the needle valve is from the axial longitudinal cavity of the unloading valve and flow from the needle valve, when opened, against its spring pressure, is axial into the minor cylinder serving the unloading valve element and axially through an axial bore in the unloading valve element and dumping to tank.

The major cylinder portion of the unloader valve is provided with an orificed passage communicating pressure in the major cavity of the unloading valve section through the cylinder cavity and below the orifice in the pilot valve section. From an operational point of view, as the pressure below the needle valve opens the needle valve, the unloading valve is unseated immediately and is buffered by the snubber action and by the fluid behind the piston of the unloader valve element discharged at a differential rate through the needle valve by reason of the orificial relation through the piston periphery and through the piston axis. Accordingly, opening of the unloader valve is synchronized with the opening of the pilot valve. Fine and smooth valve performance results from the unloading section without odjectionable slamming and performs equally well at lowest and highest capacity rating, of the particular valve.

In the drawings:

FIGURE 1 is a top elevation view of a valve structure in accord with the present invention with no bleeder included.

FIGURE 2 is a longitudinal section elevation view taken on the line II—II of FIGURE 1 and revealing the simple internal and interrelated structure of the valve sections as seen in FIGURE 1 and indicating a bleeder in preferred position.

FIGURE 3 is an exploded view of the valve structure of the present invention and revealing fabrication simplicity of the valve structure.

FIGURE 4 is somewhat schematic sectional elevation view of the valve as seen in FIGURE 2 and characteristically related operationally between piston and tank before energization of pistons.

FIGURE 5 is the same as FIGURE 4, but indicating the unloader valve in the open position during movement of the pistons in the direction of closing of the press, platen, or die.

FIGURE 6 is the same schematic structure as represented in FIGURES 4 and 5 but now indicating the flow of hydraulic fluid returning the pistons to their extended positions as the press platen, die, or press opens. On the return of the pistons, air drive is illustrated as moving the hydraulic fluid through the check valve.

FIGURE 7 is a schematic diagram illustrating a typical circuit in which the valve of the present invention is utilized and in which a preload piston is provided.

FIGURE 8 is a diagram of a modified circuit in which solenoid control elements or accessories are utilized on the check valve section and on the unloader pilot section to selectively block return or accomplish relief or dumping at any selected press or die position as monitored by limit switches. A solenoid valve is also seen on the pressure tank allowing selective relief of air drive as by venting.

FIGURE 9 is a diagram of another modified circuit and indicating the insertion of a booster to provide enhanced timed application of hydraulic pressure for stripping, or working as in reverse forming, punching or the like where work beyond the capabilities of normal air pressure in the tank is required.

FIGURE 10 is a schematic diagram illustrative of another booster circuit in which the valve of the present invention is integrated.

Specific description

Referring to the drawings and particularly the FIGURE 1, a valve structure 11 in accord with the present invention is seen isolated from any application in any particular circuit. The valve structure 11 includes an unloader section 12, a pilot section 13 serving the unloader 12, and a check valve section 14. The adjusting knob 15 is seen at the top of the pilot section 13. These are in modular block form, the main block comprising unloader section 12. Pilot section 13 is also in block form secured to the unloader section. The check valve section 14 is seen in block form capping the main block of unloader section 12.

In FIGURE 2, the interrelationship of the unloader section 12, pilot section 13 and check valve section 14 is shown. The unloader section comprises a main valve case 16 in block form provided with a longitudinal through opening 17 in which the movable unloader valve body 18 is axially reciprocable. A main cavity 19 intersects the opening 17 and penetrates the case 16 vertically as shown in the drawing. A cylindrical valve seat element 20 is inserted in one end of the opening 17 and provides an annular valve seat 21 for the unloader valve body 18. The axial opening 22 is flared outwardly in a venturi form. A connector block 23 secures the valve seat element 20 in place against the annular shoulder 24 and is sealed against the main valve case 16 by compression of the O ring 25 positioned between main valve case 16 and connector block 23. The connector block 23 is provided with opening 26 therethrough in register with the longitudinal through opening 17 and secures the valve seat element 20 in the main valve case 16. The connector block 23 is provided with connector means such as threads in the opening 26 to provide a connection to the tank, as will be seen, through selected conduit.

The other end of the longitudinal opening 17 is provided with valve body receiver element 27 comprising a generally cylindrical body of less diameter than the opening 17 and a flanged base 28 which shoulders against the main valve case 16 across the opening 17. Hence the receiver element 27 is coaxial with the opening 17 and projects into the opening 17. An axial bore is provided in the receiver 27 and an axial through opening 29 of reduced diameter is provided through the receiver element 27. As will be later seen the receiver 27 may be substantially tubular and flanged. Communicating openings 30 are provided transversely through the flange 28 of the receiver element 27 which connect with the opening 17 and annular recess 31 formed in the outboard base of the receiver element 27. An annular exterior seal such O ring 32 is provided in the main valve case 16 concentric about the opening 17, and an inner seal or O ring 33 is provided in concentric relation around the axial opening 20. Both seals 32 and 33 are in substantially the same plane and aside from preventing leakage as between main valve case 16 and the pilot section 13, they also isolate flow through axial opening 29 and the openings 30 in the flange 28. As will be seen this is important to the pilot control of the unloader valve body 18.

The unloader valve body 18 is of the stepped piston type and is longitudinally provided with an axial through opening 34. One piston surface (small) 35 guidably and axially moves in the bore of the valve receiver element 27. A compression spring 36 between receiver element 27 and valve body 18 applies axial force to the valve body 18 urging the valve body to closed position on the seat 21. The larger piston surface 37 formed by flange portion 38 is axially movable in the longitudinal opening 17. Both small 35 and large 37 piston surfaces are integral in the valve body 18. An orifice 39 is provided in a passage 40 through the flange 38 so that communication is provided at all times between the space ahead and behind the large piston surface 37 in the longitudinal opening 17. Rings or annular grooves may be used on both piston surfaces 35 and 37 as shown.

The stem portion 41 of the valve body 18 is of reduced diameter to maximize flow through the main cavity 19 and through which the stem 41 projects. A double snubber or buffer arrangement is employed where the valve body 18 engages the valve seat 21. The surface 42 engaging the valve seat 21 is frusto-conical in section extending a small distance both ways of the annular line engagement with the seat. This provides an annular flared portion 43 of the stem 41 and then drops back to the stem dimension. At the nose of the valve element 18 a flanged snubber portion 44 ahead of a necked-in portion 45 is provided in a smooth merger with the frusto-conical surface 42. As will be seen this described arrangement adjacent the seat of the valve projects one snubber portion 44 into the venturi passage 22 of the seat 20 and positions the other snubber or buffer 43 in the main cavity 19 assisting in smooth valve operation in avoidance of hammer and chatter in rapid cycling.

The pilot section 13 comprises a pilot valve block 46 flush mounted to the unloader valve case 16 in sealed relation by the concentric O rings 32 and 33. An axial opening 47 is provided longitudinally through the pilot valve block 46. The opening 47 is closed at the lower end as shown by threaded plug 48. The upper end of the opening 47 is plugged by threaded bushing 49, its associated seal 50, the axial threaded adjusting screw 51 rotatable by knob 15. Threaded lock nut 52 is provided on the screw 51 to fix the position of adjustment, once established. A coaxial cylindrical recess 53 is provided in the bushing 49 and guide piston 54 with concentric seals 55 is axially movable therein by selected threaded adjustment of the screw 51. A spring 56 biases the piston 54 into axial engagement with the screw 51 and extends axially in the opening 47 to guided retention with the pilot valve element 57. A valve seat insert 58, retained in the lower portion of the opening 47 by the plug 48 provides a valve seat 59 against which the valve element 57 closes under the normal selected bias of the spring 56. The seal 60 eliminates leakage around the insert 58.

An axial passage 61 is provided through the insert 58 and case 46. This axial passage is provided with a radial opening 62 in axial register with the opening 30 through the flange 28 of the receiver 27. Similarly, a transverse opening 63 is provided through the pilot valve case 46 connecting with the axial opening 29 in the receiver element 27. Hence, as shown, flow from the longitudinal opening 17 of the unloader valve section can pass through the ports 30 and openings 62 to the valve seat 59 and may, as will be seen, open the valve element 57 off its seat 59. Flow through the valve seat 59 in passing the valve element 57 will move through the opening 63 and axially through unloader valve body 18. Hence, main cavity pressure is sensed through the valve body 18 to the pilot section 13 and when the valve element 57 is unseated the resulting imbalance will be seen to unseat the unloader valve body 18 in synchronized response to any quantum of flow within the size capacity of the unloader valve.

Blocking axial flow through the main cavity 19 is the check valve section 14. The check valve comprises a valve case 64 having a longitudinal bore 65 therethrough. One end of the valve case 64 and bore 65 is provided with threads 66 for circuit connection as will be hereinafter appreciated. The other end of the bore 65 is plugged as by end plate 67 with its seal 68. The end plate 67 serves as a spring retainer for the spring 69. An annular seat 70 is positioned in the open end of the bore 65 in shouldered relation thereagainst and in concentric relation to the axis of bore 65. The valve element 71 is reciprocably positioned in the bore 65 and is provided with a longitudinal coaxial recess 72 which receives the spring 69. The spring 69 normally biases the valve element 71 against the seat 70. A radial opening 73 penetrates the valve element 71 communicating with the recess 72. Transverse to the bore 65 is the passage 74 which is in axial register with the main cavity 19. O ring 75 concentrically about the passage 74 and upper opening of cavity 19 provides a seal as between the main unloading valve case 16 and the check valve case 64.

An air bleeder 76 is positioned in the unloader valve case 16 for bleeding air from the longitudinal bore 17 of the unloader valve case.

As will be seen assembly of the valve structure 11 is easily accomplished as best shown in FIGURE 3 using recessed headed bolts 77 as seen. Hence the unloader valve section 12 indicated by reference to its case 16 is provided with the two transverse intersecting through openings 17 and 19. The unloader valve elements exemplified by seat insert 20 and valve stem body 18 and piston receiver 27' and spring 36. In the FIGURE 3 the flanged receiver element 27 is slightly modified from the form shown in FIGURE 2 by allowing the spring 36 to bias at one end directly against the pilot case 46, thereby avoiding the machining of the receiver to provide an internal thrust shoulder for the spring 36. Operation of both forms of receiver 27 and 27' is otherwise identical. The pilot valve case 46 of the pilot section 13 closes the assembly of the unloader valve at one end and the connector block 23 closes the seat assembly.

The pilot valve seat insert 58 is assembled in the bottom of the pilot case 46 and secured in position by plug 48. Pilot valve element 57 is assembled over it and piston 54 with its seals is inserted in the bushing 49. Bushing 49 is then screwed into the opening 47 and the threaded adjusting stem 51 is turned into the axial opening through the bushing 49 and through lock nut 52 and with seals as indicated. As will be appreciated the pressure holding the valve element 57 in closed relation on the seat 59 may be varied by adjustment of the stem 51 by turning the knob 15. In this manner the valve pressure relief or holding pressure point is selected. This selected pressure provides a constant resistance against closing of the press or die.

By reference to FIGURES 4, 5 and 6 the cycling of the valve structure 11 as exemplified in FIGURES 1, 2 and 3 is expressed in a simplified schematic manner in a typical die-press arrangement. In FIGURE 4, the work pistons 80 are fully extended as by hydraulic fluid under pressure as from the compressed gas in the tank 81 acting on the fluid. The pressure of the gas in the tank 81 is by means of a compressor not shown. The press platen or die section 82 served by the pistons 80 is shown elevated indicating for example that the press is in an open position preliminary its downward stroke, or in the case of the pistons being positioned in the platen or die section secured to the platen, before press closing.

A conduit 84 from the cylinders 83 leads to the valve structure 11 and to the main cavity 19 thereof. The cavity 19 is filled and no flow to tank 81 occurs because the unloader valve 85 and check valve 86 blocks any return flow to the tank 81 via lines 87 or 88. However, fluid is behind the major piston of unloader valve 85 through the port 40 and is in pressure contact with the pilot valve 89 through the passage 30 and 60 but at a standing value lower than the set point of the pilot valve 89. Fluid also augments the spring closure of check valve 86 by movement through passage 73 and tending to close the check value 86.

In FIGURE 5 the press has begun to close for the full stroke of pistons 80 in cylinders 83, as shown. During this time the relatively incompressible fluid commences to move as the pistons 80 are displaced and the resistance against movement provided by the pistons 80 is dependent upon the pressure setting of the pilot valve 89. For example if the pilot valve 89 is set to open at 100 pounds per square inch, then when that pressure is achieved in the main cavity 19 it is present in the bore 17 by virtue of opening 40 and this pressure is communicated to the pilot valve through openings 30 and 61 thereby overcoming the bias on the valve 89. The pilot valve 89 opens and spills through the stem of valve 85 to tank 81. This unbalances the unloader valve 85 and it opens buffered by the construction previously described and is cushioned or dampened by the orificial flow relation occurring by reason of the restricted flow through port 22. The opening of the unloader valve 85 allows flow to the tank 81 through the line 87. Flow cannot occur through the check valve 86. Since a mechanical press follows a crank arm motion the resultant kinetics cause variance in press closing and opening velocities. The valve as presently described accommodates automatically to these variances so that action of the unloading valve is smooth and resistance is even within the capacity range of a given valve size.

Through the entire closing of the press the resistence of the pistons 80 are determined by the setting of the pilot valve 89.

In FIGURE 6 the platen or die section 82 is opening from the point indicated in FIGURE 5 and during this motion the pistons 80 follow the retraction of the platen or die section 82 by reason of the piston return pressure provided by the compressible gas in the tank acting on the fluid or oil. Since the pistons 80 stopped their closing movement the pilot valve 89 closed and the valve 85 also is closed but the bias on the check valve 86 is overcome by the differential in pressure between tank 81 and cavity 19 and flow from the tank 81 is made possible through the check valve 86, thence through the main cavity 19 and thence through conduit 84 elevating the pistons 80 in the cylinders 83.

While the control valve structure 11 has been fully described in the simplest of operating settings it is important to the invention to appreciate a wide variety of operatng settings in which the valve structure 11 finds use. In FIGURE 7, accordingly, a schematic representation indicates the circuit of, for example FIGURE 6 but with the piston 95 leading the normal set piston 96 by a distance A. In this manner the valve structure 11 is preloaded in each cycle of press platen or die element 97 before actual work engagement involving both of the pistons 95 and 96. In FIGURE 8 the preload concept is involved in sequential pistons 100, 101 and 102 and hydraulic fluid is cycled through the control valve structure 11, to and from the tank 104. In addition solenoid controls 105 have been added to the pilot section 106 so that at any given point of stroke, as monitored by limit switch 107, all resistance can be relieved as is desirable in certain press and die operations. By reference to FIGURE 2, this is easily accomplished by removing the plug 48 of pilot section 13 and substituting therefore a solenoid operated piston which selectively unseats the valve element 57. While solenoid operation is preferred, air cylinders may also be used or hydraulic and mechanical means timed to press or die movement. Unseating of the pilot valve element 57 opens the unloading section and dumps the flow direct to tank. Similarly, a solenoid operated valve 108 serviced by solenoid 109 and limit switch 110 may be used to drop tank pressure simultaneous with the dump accomplished by solenoid 105 or in sequence thereto, as desired. Not unusually it is desirable in press or die cycling to delay the return of the pistons 100, 101 and 102 behind the release movement of the platen or die element 111 so that the pistons lag in following the opening of the die or press. While this may be accomplished by relief of the air using, for example, the solenoid 109, it may also be accomplished by solenoid 112 energized by limit switch 113. In such an instance the solenoid 112 physically blocks the opening of the check valve in check valve section 14. This accessory change is easily accomplished by substitution of the solenoid 112 for the cover 67 in FIGURE 2. In FIGURE 9, a booster or differential piston 114 has been inserted in the circuit generally described in FIGURE 8 and which is of principal use in providing augmented return pressures as may be necessary in situations where the work pistons 115 and 116 are intended to do work during their return stroke. The control valve 11 operates as previously described in providing selected resistance during the closing stroke of press or die element 111 and with or without selected relief as provided by solenoid 105 and related limit switch 107. However, as the press or die element 111 retracts, with or without delay as selectively provided by solenoid 112 and its limit switch 113, the booster 114 is energized by air controlled as by solenoid 117 and 118. The differential in piston size increases the air pressure and applies to the fluid side of the piston a substantially increased pressure in a well known manner so that upon return of fluid to the work pistons 115 and 116 an increase in pressure value is provided. The check valve 119 may be used to isolate the flow of fluid from return to the tank 104. A simplified variant, in avoidance of check valve 119 is seen in FIGURE 10. In FIGURE 10 the booster 114 shuts off or closes the line 120 between tank 104 and booster 114 and thereby eliminates the need for the check valve 119. Controls, for example the solenoid control over air as set out in FIGURE 9 is employed to cycle the booster 114 as desired.

Not shown, but representing another adaptability of the valve 11, is the use of plural pilot sections 13 in stacked relationship to achieve several pressure settings in a single stroke of press or die. This is made possible by the superior performance of the valve 11 over the entire spectrum of the valve capacity. In such cases the pilots 13 are series connected and may be solenoid actuated at selected intervals of stroke.

In control of various circuits in which the valve structure 11 may be employed those skilled in the art will appreciate many variations depending upon the availability and reliance of electrical, pneumatic, hydraulic, and mechanical means to achieve selected results in a given circuit. Substantially all of these variations in circuit may utilize the basic valve structure 11 as described herein and accessories, as indicated, are easily provided in a modular manner to any selected work conditions. Repair and replacement is facilitated and the pressure relief valve elements comprising pilot section 13 and unloaded section 12 work neatly together in providing chatter-free smooth valve performance with repetitive accuracy over substantially the entire capacity range of the selected valve.

The valve structure of the present invention is intended for primary usage in press and die hydraulic situations where variance in closing and opening velocities are obvious. However, once the structure and performance of the valve structure 11 is understood those skilled in the art will appreciate other applications of the valve herein and such modifications, improvements, or changes in use setting are intended to be included in the scope of the presentation limited only by the scope of the hereinafter appended claims.

We claim:
1. A valve structure in flow control relation in a circuit between the pistons in a press or die and a reservoir under pressure in which a selected resistance is provided to the depression of the pistons and a selected pressure is applied to return the pistons to their extended position sequenced in accord with the closing and opening movement of the die or press comprising:
   (a) a valve block having an elongate through opening and a main cavity therein transverse to said elongate opening and intersecting the elongate opening;
   (b) an unloading valve in said elongate opening and normally closing passage from said elongate opening and said main cavity against flow to said reservoir and provided with an orificial passage and a separate axial passage communicating to said reservoir;
   (c) a pilot valve blocking said elongate opening at one end thereof and in pressure sensing contact with flow through said unloading valve and upon opening spilling through the axial passage through said unloading valve whereby the opening and closing of said unloading valve is synchronized with the opening and closing of said pilot valve at selected pressure and a physical access opening axially aligned with said pilot valve closed by removable plug means; and
   (d) a check valve blocking flow from said main cavity to said reservoir and allowing flow from said reservoir to said cavity when pressure in said cavity drops below the pressure from said reservoir and a physical access opening behind said check valve closed by removable plug means.

2. The combination as set forth in claim 1 and including an accessory engaging said check valve and preventing the opening thereof for a selected period whereby said pistons are delayed in their extension.

3. The combination as set forth in claim 1 and including an accessory insertable in said pilot valve to selectively open and close said pilot valve thereby lowering resistance to depression of said pistons at any selected point of piston travel and causing synchronized opening of said unloader valve.

4. The combination as set forth in claim 3 wherein a check valve delay accessory is used in combination with said pilot valve accessory in said combination valve structure.

5. The combination as set forth in claim 1 wherein a booster is selectively employed with said valve structure so as to increase the pressure above tank pressure during extension of said pistons with flow through said check valve.

6. A valve structure for control of flow and pressure intermediate a pressurized reservoir, and pistons acted upon during closing and opening of a die or press comprising:
   (a) an unloader valve section including an elongate valve block having a longitudinal opening therethrough in which an axially hollow piston type valve body having an orificial passage therethrough is reciprocable and normally closes a coaxial discharge port to said reservoir;
   (b) an adjustable pilot valve section closing the end of said elongate opening at the end of said valve block opposite said discharge port and operable by pressure in said elongate opening and discharging upon opening through said axial hollow opening in said unloader valve, and upon opening causing synchronized opening of said unloader valve section and including a selectively removable plug coaxial with said pilot valve section; and
   (c) a plug type axially movable check valve detachably mounted over one of the openings into a main cavity in said unloader valve block and normally closed in prevention of flow from said main cavity and opening to allow flow into said main cavity and including a removable cap closing one end of said check valve.

7. In the combination of claim 6 wherein an axially movable piston means in inserted in the said pilot valve section when its plug is removed and movable to selectively hold open said pilot valve.

8. In the combination of claim 6 wherein an axially movable holding member is coaxially inserted in said check valve when the cap is removed and selectively blocking the opening of said check valve.

9. In the combination of claim 8 wherein a booster is provided intermediate a pressurized reservoir and said check valve and said booster is selectively activated to increase the pressure of flow through said check valve.

References Cited

UNITED STATES PATENTS

| | | | |
|---|---|---|---|
| 2,239,657 | 4/1941 | Stadlin | 137—491 |
| 2,388,820 | 11/1945 | Bonnell | 137—491 |
| 2,807,274 | 9/1957 | Evans. | |
| 2,930,398 | 3/1960 | Barrett et al. | 137—489 |
| 3,124,343 | 3/1964 | Williamson | 137—489 XR |
| 3,147,723 | 9/1964 | Williamson | 137—491 XR |

DANIEL BLUM, Primary Examiner

U.S. Cl. X.R.

267—1